United States Patent
Wen et al.

(10) Patent No.: US 10,650,185 B2
(45) Date of Patent: May 12, 2020

(54) ACCESSIBLE PROCESSING METHOD OF WEBPAGE CONTENTS AND ACCESSIBLE WEBPAGE DEVICE

(71) Applicant: TENCENT TECHNOLOGY (SHENZHEN) COMPANY LIMITED, Shenzhen (CN)

(72) Inventors: He Wen, Shenzhen (CN); Liyong Li, Shenzhen (CN); Xu Zhang, Shenzhen (CN); Wei Guo, Shenzhen (CN); Yang Li, Shenzhen (CN); Weijian Jin, Shenzhen (CN); Xiaojun Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 824 days.

(21) Appl. No.: 14/882,539

(22) Filed: Oct. 14, 2015

(65) Prior Publication Data

US 2016/0034432 A1    Feb. 4, 2016

Related U.S. Application Data

(63) Continuation of application No. PCT/CN2014/075045, filed on Apr. 10, 2014.

Foreign Application Priority Data

Apr. 16, 2013   (CN) .......................... 2013 1 0130866

(51) Int. Cl.
   *G06F 17/00* (2019.01)
   *G06F 40/137* (2020.01)
   (Continued)

(52) U.S. Cl.
   CPC .......... *G06F 40/137* (2020.01); *G06F 16/382* (2019.01); *G06F 16/94* (2019.01);
   (Continued)

(58) Field of Classification Search
   CPC .................................................. G06F 17/2241
   See application file for complete search history.

(56) References Cited

U.S. PATENT DOCUMENTS 6,769,096 B1 *   7/2004   Kuppusamy ...... G06F 17/30014
                                                          707/999.01
8,453,045 B2 *   5/2013   Tanaka ............... G06K 9/00469
                                                          715/205

(Continued)

FOREIGN PATENT DOCUMENTS

CN       1553379 A       12/2004
CN       101727497 A     6/2010
(Continued)

OTHER PUBLICATIONS

Search Report in International Application No. PCT/CN2014/075045 dated Jul. 14, 2014, 2 pages.
(Continued)

*Primary Examiner* — Mustafa A Amin
(74) *Attorney, Agent, or Firm* — Brinks Gilson & Lione

(57) ABSTRACT

An accessible processing method of webpage contents and accessible webpage device are provided. The foregoing accessible processing method may include the follows. A document outline list tag is added to a webpage. After the document outline list tag obtains a focus, the following is further included. All title tags of a specified level in current webpage may be traversed. An anchor point may be added to each title tag of the specified level. Text information of each title tag of the specified level may be respectively copied to a corresponding link newly established. The link
(Continued)

newly established may be enabled to point to an anchor point of a corresponding title label. Each link newly established may be taken as a list item. The list item may be added to the document outline list tag.

14 Claims, 2 Drawing Sheets

(51) Int. Cl.
    *G06F 16/38*     (2019.01)
    *G06F 16/93*     (2019.01)
    *G06F 16/955*     (2019.01)
    *G06F 40/14*     (2020.01)
    *G06F 40/134*     (2020.01)

(52) U.S. Cl.
    CPC ........ *G06F 16/9558* (2019.01); *G06F 40/134* (2020.01); *G06F 40/14* (2020.01)

(56) References Cited

U.S. PATENT DOCUMENTS

| | | | | |
|---|---|---|---|---|
| 2003/0212957 | A1* | 11/2003 | Graham | G10L 15/22 715/234 |
| 2007/0162524 | A1 | 7/2007 | Coe et al. | |
| 2008/0244381 | A1* | 10/2008 | Nicolaou | G06F 17/2745 715/234 |
| 2009/0083027 | A1* | 3/2009 | Hollingsworth | G06F 17/277 704/9 |
| 2009/0287994 | A1* | 11/2009 | Ichino | G06F 17/211 715/234 |
| 2010/0199215 | A1* | 8/2010 | Seymour | G06F 3/0481 715/808 |
| 2010/0205523 | A1* | 8/2010 | Lehota | G06F 16/9577 715/235 |
| 2011/0154212 | A1* | 6/2011 | Gharpure | G06F 17/30867 715/738 |
| 2012/0089895 | A1* | 4/2012 | Ishii | H04M 1/72583 715/205 |
| 2012/0144292 | A1 | 6/2012 | Lee | |
| 2013/0055068 | A1 | 2/2013 | Mahmud | |
| 2013/0055077 | A1* | 2/2013 | Hagel-Sorensen | G06F 17/212 715/273 |
| 2013/0185642 | A1* | 7/2013 | Gammons | G06F 3/0482 715/733 |
| 2014/0089772 | A1* | 3/2014 | Shetty | G06F 17/3089 715/206 |
| 2014/0188479 | A1* | 7/2014 | Bellamy | G10L 13/033 704/260 |
| 2014/0331123 | A1 | 11/2014 | Li | |

FOREIGN PATENT DOCUMENTS

| | | |
|---|---|---|
| CN | 101986297 A | 3/2011 |
| CN | 102542008 A | 7/2012 |
| CN | 102831229 A | 12/2012 |
| CN | 102999502 A | 3/2013 |

OTHER PUBLICATIONS

International Preliminary Report on Patentability and Written Opinion in International Application No. PCT/CN2014/075045 dated Oct. 20, 2015, 8 pages.

Office Action in CN Application No. 201310130866.X dated Sep. 4, 2017, 6 pages.

"Information Accessibility Based on Internet", Published in the Internet World, Sep. 3, 2006, pp. 78-79.

"Overview of Information Accessibility in the United States: Interpretation of Section 508", Published in E-education Research, Dec. 31, 2007, pp. 86-91.

\* cited by examiner

ACCESSIBLE PROCESSING METHOD OF WEBPAGE CONTENTS AND ACCESSIBLE WEBPAGE DEVICE

The application is a continuation of International Application No. PCT/CN2014/075045 filed on Apr. 10, 2014, which claims the priority of Chinese patent application, No. 201310130866.X, titled "accessible processing method of webpage contents and accessible webpage device", which was filed on Apr. 16, 2013. The disclosures of the application No. 201310130866.X are incorporated here by reference.

TECHNICAL FIELD

The present disclosure relates to human-computer interaction technologies, and more particularly, to a method and device about accessible human-computer interaction of webpage contents.

BACKGROUND

Web Accessibility Initiative Accessible Rich Internet Applications (WAI-ARIA) technologies are human-computer interaction technologies for disabled people, such as visual impairment, hearing impairment, tied by the leg, and in particular, like blind people. The WAI-ARIA technologies have opened corresponding human-computer interaction standards, which may cooperate with a corresponding accessible auxiliary device, e.g., screen reading software, and execute the human-computer interaction. For example, based on the WAI-ARIA standards, the screen reading software may read aloud webpage contents or output corresponding braille, which may be generally used by blind people, and is one of the most commonly used software of blind people. The ARIA technologies refer to technical specifications, which may enable the screen reading software to accurately identify contents, change and state of a webpage, such that blind users may read webpages in a barrier-free manner.

Accessible processing about webpage contents refers to executing integrity supplement and filling in of information accessibility necessary for a file in a specific webpage, so as to cooperate with an accessible auxiliary tool, such as screen reading software of client. In the implementation of accessible webpage information, web side may be adapted to an accessible auxiliary device, such as screen reading software, in a relatively passive way.

The accessible auxiliary device, such as screen reading software, may obtain webpage information of a webpage, by mainly relying on source codes of the webpage. When a certain section of codes has obtained a focus, the screen reading software may start to read related information in the codes, such as link, picture and text information. However, in certain webpages with huge amount of information, such as channel homepage of portals, webpages of this category may possess a huge amount of information, which may have thousands of document entry links. In conventional screen reading software technologies, it is necessary to switch these links one by one, which may be extremely inconvenient for blind users to use.

In current WAI-ARIA technologies, related attribute technologies have been opened, such that corresponding auxiliary devices (such as screen reading software) may rapidly switch among some important areas in a webpage, instead of switching links one by one, which may improve operation convenience of disabled people to some extent. However, the foregoing some important areas mainly refer to functional categories of webpage, which may include 8 kinds of functional categorizes altogether: banner, navigation, search, main, complementary, content info, application, form, instead of area division about webpage document information. The foregoing some important area is not applicable for a webpage with huge amount of document information, such as channel homepage. Disabled users may not rapidly understand document outline of the whole webpage, may not access the document outline at any time, and may not rapidly switch among each document content area of the document outline.

SUMMARY

In view of above, the main objectives of the present disclosure are to provide an accessible processing method of webpage contents and a corresponding device, so as to improve information amount learned by disabled people from a webpage with a large amount of information, improve convenient degree for disabled people to learn information, and improve portability for users to switch among each document content area of a webpage.

Technical solutions of the present disclosure may be as follows.

An accessible processing method of webpage contents, which includes:
  adding a document outline list tag to a webpage;
  wherein after the document outline list tag obtains a focus, the method further includes:
    traversing all title tags of a specified level in current webpage;
    adding an anchor point to each title tag of the specified level;
    respectively copying text information of the each title tag of the specified level to a corresponding link newly established;
    enabling the link newly established to point to an anchor point of a corresponding title tag;
    taking each link newly established as a list item; and
    adding the list item to the document outline list tag.

An accessible webpage device, which includes a document outline list tag and a document outline obtaining module;
  wherein after the document outline list tag obtains a focus, the document outline obtaining module is configured to:
    after current webpage loads, traverse all title tags of a specified level in current webpage;
    add an anchor point to each title tag of the specified level;
    respectively copy text information of the each title tag of the specified level to a corresponding link newly established;
    enable the link newly established to point to an anchor point of a corresponding title tag;
    take each link newly established as a list item; and
    add the list item to the document outline list tag.

An accessible webpage device, which includes a memory, a processor in communication with the memory, and an interface, wherein the memory is configured to store a document outline list tag and a document outline obtaining instruction, and the document outline obtaining instruction is executable by the processor;
  wherein after the document outline list tag obtains a focus, the document outline obtaining instruction indicates to:
    after a webpage loads, traverse all title tags of a specified level in the webpage;

add an anchor point to each title tag of the specified level via the interface;

respectively copy text information of the each title tag of the specified level to a corresponding link newly established;

enable the link newly established to point to an anchor point of a corresponding title tag;

take each link newly established as a list item; and add the list item to the document outline list tag.

Compared with the prior art, by employing the accessible processing scheme of webpage contents provided by the present disclosure, after the document outline list tag obtains the focus (obtaining the focus refers to that the accessible auxiliary device may identify contents within the document outline list tag), a document outline list of current webpage, which may be identified by the accessible auxiliary device, may be generated automatically. Thus, the accessible auxiliary device may identify all list items in the document outline list, that is, a title of each specified level, such that information amount learned by disabled people from a webpage with a large amount of information, and convenient degree for disabled people to learn information may be improved. Meanwhile, portability of users to switch among each document content area of the specified level in a webpage may be improved. Thus, disabled people employing the accessible auxiliary device (such as screen reading software) may conveniently understand the global outline contents of current webpage, such that users may experience the whole flow of reading and comments.

BRIEF DESCRIPTIONS OF THE DRAWINGS

DETAILED DESCRIPTIONS

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

In the present disclosure, the document outline refers to a webpage, which may generally be a Hypertext Markup Language (HTML) webpage. Contents of the webpage may possess semantics by using a tag. For example, "h1" may denote a title of a first level. "h2" may denote a title of a second level. "p" may denote a paragraph. By extracting contents which denote the document outline, such as h1, h2, a document outline of a page may be formed.

In the present disclosure, the accessible auxiliary device refers to auxiliary software of webpage accessible technologies. As long as certain contents in a webpage have obtained a focus, in which obtaining the focus refers to informing the accessible auxiliary device about a destination point to be analyzed, the accessible auxiliary device may obtain webpage contents indicated by the focus, and may convert the webpage content information into human-computer interaction information, which may be understood by specified users. For example, the screen reading software may convert webpage content information into voice to be outputted, or into corresponding braille to be outputted. The voice outputting or braille outputting refers to human-computer interaction information, which may be understood by specified users (such as blind people or visually impaired people).

Figure 1:
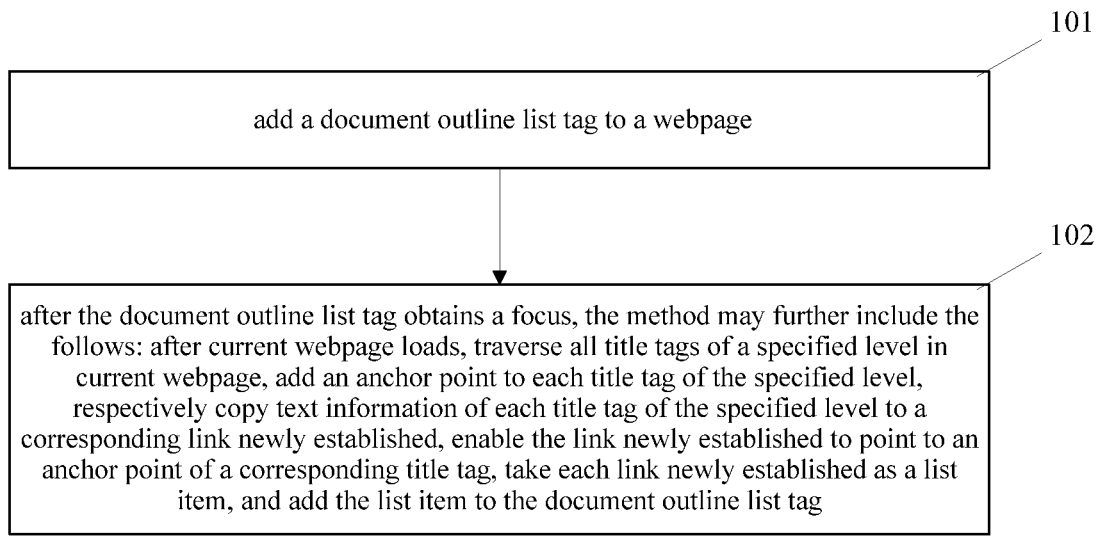
FIG. 1 is a flowchart illustrating an accessible processing method of webpage contents, in accordance with an example of the present disclosure.

FIG. 1 is a flowchart illustrating an accessible processing method of webpage contents, in accordance with an example of the present disclosure. As shown in FIG. 1, the method may include the following blocks.

In block 101, add a document outline list tag to a webpage. For example, in an HTML webpage, the document outline list tag may be added in the manner of ul tag.

In block 102, after the document outline list tag obtains a focus, the method may further include the follows. After current webpage loads, traverse all title tags of a specified level in current webpage. Add an anchor point to each title tag of the specified level. Respectively copy text information of each title tag of the specified level to a corresponding link newly established. Enable the link newly established to point to an anchor point of a corresponding title tag. Take each link newly established as a list item, and add the list item to the document outline list tag.

The title tag of specified level may be specified in advance, e.g., which may be h1, h2 or h3 tag. Generally speaking, since h2 tag is used by relatively important contents in a webpage and title of each section, in an example, the title tag of specified level may be h2 tag.

Thus, after the document outline list tag obtains the focus, that is, after a user has browsed the document outline list tag by utilizing the accessible auxiliary device, by executing foregoing block 102, the document outline list of current webpage may be obtained and added to the document outline list tag, such that the accessible auxiliary device may obtain and output each list item in the document outline list, that is, each title of the specified level. Subsequently, information amount learned by disabled people from a webpage with a large amount of information, and convenient degree for disabled people to learn information may be improved. Meanwhile, portability of switching by users among each document content area of specified level in a webpage may be enhanced.

In a specific example, the method may further include the follows. Set an accessible semantic identity (ID) in the document outline list tag. Contents of the accessible semantic ID may include operation instructions of the document outline. For example, the title attribute value in the HTML tag is one kind of accessible semantic ID. The title attribute may define additional information of element. The contents of the accessible semantic ID may be identified by the accessible auxiliary device. Thus, after the document outline list tag obtains the focus, the accessible auxiliary device may be enabled to directly output contents of the accessible semantic ID, that is, the operation instructions of the document outline. And then, the disabled people may be further instructed to execute subsequent document outline operations, and convenient degree for disabled people to learn information may be improved.

In a specific example, the process of adding the document outline list tag to the webpage may include the follows. Add the document outline list tag after navigation position of the webpage. Generally speaking, the navigation position may be a first position occurred in a webpage, which indicates starting of webpage information. Thus, when disabled people employ the accessible auxiliary device to browse webpage information in sequence, after browsing navigation information, the document outline list tag may be enabled to timely obtain the focus, such that the disabled people may timely obtain document outline contents of the webpage, the timeliness may also be improved.

In a specific example, the method of the present disclosure may further include the follows. Set an attribute value of a shortcut key of a tag in the document outline list tag. For example, in the HTML, the attribute of a shortcut key may generally be accesskey. After using the accesskey attribute, an alt+accesskey attribute value may be used, such that the set element may obtain the focus. The foregoing attribute may generally be used for an element, which has obtained the focus, such as link and form element. For instance, in the example, value of accesskey in the document outline list tag may be set as q, which denotes that a combination key of alt+q may be the shortcut key of the tag. Thus, after disabled people know the shortcut key, at any time when browsing current webpage, as long as the shortcut key of alt+q has been pressed, the document outline list tag may be enabled to re-obtain the focus, such that the accessible auxiliary device may re-obtain and output each list item in the document outline list, and repeat operations of disabled people may be further facilitated.

In a further example, the method of the present disclosure may further include the follows. Set a first element in a webpage as a document outline prompt description tag, and set the accessible semantic ID in the document outline prompt description tag. The contents of the accessible semantic ID may include shortcut key information of the document outline list tag. Thus, after accessing current webpage, the document outline prompt description tag may firstly obtain the focus. The contents firstly outputted by the accessible auxiliary device are the contents in the accessible semantic ID of the document outline prompt description tag. That is, after accessing current webpage, a user may immediately learn the contents of the accessible semantic ID in the document outline prompt description tag, so as to timely learn that pressing which shortcut key may achieve the objective of rapidly browsing the document outline list.

In a further example, the document outline prompt description tag may be a link tag. Destination contents pointed to by the link of the link tag may be detailed accessible descriptions. Besides, the contents of the accessible semantic ID in the document outline prompt description tag may further include: prompt information for viewing detailed accessible descriptions, and/or, other prompt description information, e.g., prompt information for executing a linear reading (such as "executing the linear reading with arrow keys").

In a further example, the method of the present disclosure may further include the follows. Set the attribute value of shortcut key of the tag in the document outline prompt description tag. For example, set value of accesskey in the document outline prompt description tag as 0, which denotes that a combination key of alt+0 is the shortcut key of the tag. Thus, at any time when browsing current webpage, as long as a user presses the combination key of alt+0, the document outline prompt description tag may re-obtain the focus. Correspondingly, the accessible auxiliary device may re-output the contents of the accessible semantic ID in the document outline prompt description tag, such that repeat operations of disabled people may be further facilitated.

Further descriptions about the technical solutions of the present disclosure may be provided in the following with an example, in which screen reading software is taken as the accessible auxiliary device, and a specific channel webpage is employed.

In block 201, add a document outline prompt description tag to a webpage. The document outline prompt description tag is a link tag. A destination webpage pointed to by the link of the link tag is a page about detailed accessible descriptions. Take codes about this section of document outline prompt description tag as a first element in the body of the webpage. Control the contents of the codes not to be displayed visually, by using style codes of Cascading Style Sheet (CSS). The link may be read, by using the screen reading software. Value of title attribute of the document outline prompt description tag may be set as follows: "press alt+Q to access the document outline, so as to rapidly switch among each content area, you may press enter key now to view detailed accessible descriptions, or use arrow keys to execute a linear reading". Thus, after accessing the webpage, the document outline prompt description tag may firstly obtain the focus. Contents firstly read by the screen reading software are the document outline prompt description tag. That is, after accessing the webpage, a user may listen to the follows: "press alt+Q to access the document outline, so as to rapidly switch among each content area, you may also press enter key now to view detailed accessible descriptions, or use arrow keys to execute a linear reading".

Besides, attribute value of shortcut key accesskey in the document outline prompt description tag may be set as 0. Thus, as long as pressing alt+0 in subsequent time, the codes of the document outline prompt description tag may re-obtain the focus. The screen reading software may re-read contents of the codes, which have obtained the focus. Specifically speaking, the screen reading software may re-read contents of title attribute in the codes of this end. For example, an instance about specific codes of a document outline prompt description tag is provided as follows.

<a href="http://www.qq.com/accessibility/" title="press alt+Q to access the document outline, so as to rapidly switch among each content area, you may also press enter key now to view detailed accessible descriptions, or use arrow keys to execute a linear reading" accesskey="0" target="_blank" style="width:0;height:0;overflow:hidden;display:block; font:0/0 Aria">accessible descriptions</a>

In block 202, after navigation position of the webpage, add a ul tag, and take the ul tag as the document outline list tag, for example, specific codes within the tag may be as follows.

<ul accesskey="q" tabindex="0" id="accessList" title="webpage outline, you may press tab key or arrow keys to select a content category, and press enter key to jump to a corresponding area "style="width:0;height:0;overflow:hidden;display:block; font:0/0 Arial"></ul>

The "ul" tag is an unordered list tag of the HTML. The accesskey="q", which denotes as follows. When pressing alt+q, codes within the ul tag of this section may obtain the focus. The screen reading software may read the contents in the title attribute of the codes, which have obtained the focus. Tabindex="0" denotes that functions, which enable the codes to obtain the focus, are available. Id="accessList" denotes that the id of the ul tag is an access control list.

Based on the technical solution of the present disclosure, when a user browses the foregoing webpage, once the user presses the shortcut key of "alt+q", subsequent blocks 203 and 204 may be executed, so as to obtain the document outline list of specified level of current webpage. Descriptions will be provided in the following with an example, in which the h2 tag in the webpage may be taken as the title tag of specified level. H2 tag is a tag element of second-level title defined by the HTML. Generally speaking, the h2 tag may be employed by relatively important contents in a page, or by title name of each section. Definitely, the specified level may be specified in advance, which may be h1, h3, or other levels.

In block 203, after current webpage is fully loaded, traverse all h2 tags in the webpage by using javascript. Add a name attribute (that is, an anchor point) to each h2 tag. For example, assignment may be executed in the manner of "#goAccessAnchor+number". The javascript is one kind of computer scripting language, which is mainly explained and executed by a web browser (that is, client).

In block 204, respectively copy text information of each h2 tag in the webpage to a corresponding link newly established, by utilizing javascript. Enable the link newly established to point to name value of a corresponding h2 tag element. And then, respectively wrap each link newly established with a li tag. The li tag is one kind of list item in the HTML. Finally, add li of this group to the ul tag in block 202. Thus, the document outline list of h2 level may be formed. That is, each li tag is one list item. Each li tag may include text information of one h2 tag element. Each list item is a link pointing to a corresponding h2 anchor point within the webpage. Users may press tab key to switch and select a certain list item. When selecting one list item, webpage codes may obtain the focus of this list item. The screen reading software may read the text information of the h2 tag element, which is included in the list item of the focus. Thus, the user may determine that which list item has been selected currently, based on heard text information. When a certain list item has been switched to, by using the tab key, or after switching to a certain list item and pressing the enter key, the link of the list item may be triggered. Since the link of the list item points to the corresponding h2 anchor point within the webpage, it may rapidly switch to the content area of corresponding h2 tag element. The effects of rapid switch may be achieved.

In addition, at any time when browsing current webpage, as long as the user presses the shortcut key of alt+q, blocks 203 and 204 may be automatically executed once again, such that the user may be enabled to re-hear the document outline list of h2 level of current webpage.

Figure 2:
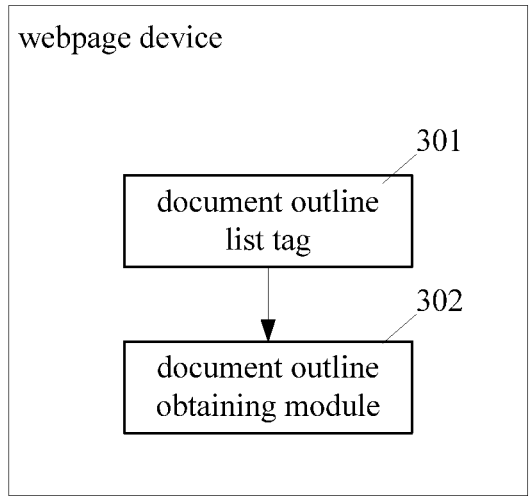
FIG. 2 is a schematic diagram illustrating structure of an accessible webpage device, in accordance with an example of the present disclosure.

Corresponding to the foregoing method, the present disclosure also provides an accessible webpage device, that is, a webpage device, which may execute the foregoing method and may correspond to a webpage. FIG. 2 is a schematic diagram illustrating structure of an accessible webpage device, in accordance with an example of the present disclosure. As shown in FIG. 2, the accessible webpage device may include a document outline list tag 301 and a document outline obtaining module 302.

The document outline obtaining module 302 may be executed by javascript. After the document outline list tag obtains the focus, the document outline obtaining module 302 is configured to execute the following operations. Traverse all title tags of a specified level in current webpage, after current webpage loads. Add an anchor point to each title tag of the specified level. Respectively copy text information of each title tag of the specified level to a corresponding link newly established. Enable the link newly established to point to the anchor point of corresponding title tag. Take each link newly established as one list item. Add the list item to the document outline list tag.

Thus, after the document outline list tag obtains the focus, that is, after the user browses the document outline list tag by utilizing the accessible auxiliary device, by using the foregoing document outline obtaining module 302, the document outline list of current webpage may be obtained and added to the document outline list tag. Thus, the accessible auxiliary device may be enabled to obtain and output each list item of the document outline list, that is, each title of the specified level, so as to improve information amount learned by disabled people from a webpage with a large amount of information, and improve convenient degree for the disabled people to learn information. Meanwhile, portability for users to switch among each document content area of specified level in the webpage may be enhanced.

In a specific example, an accessible semantic ID is set in the document outline list tag 301. The contents of the accessible semantic ID may include operation instructions of the document outline. Thus, after the document outline list tag obtains the focus, the accessible auxiliary device may be enabled to directly output the contents of the accessible semantic ID, that is, the operation instructions of the document outline. Thus, disabled people may be further instructed to execute subsequent document outline operations, and portable degree for disabled people to learn information may also be improved.

In a specific example, the document outline list tag 301 is located after the navigation position of the webpage. Thus, when disabled people browse webpage information in sequence by using the accessible auxiliary device, after browsing the navigation information, the document outline list tag may be enabled to timely obtain the focus. Thus, the disabled people may be further facilitated to timely obtain the document outline contents of the webpage, and timeliness may also be improved.

In a specific example, an attribute value about the shortcut key of the tag may also be set in the document outline list tag 301. For example, in the HTML, attribute of the shortcut key is generally accesskey. After using the accesskey attribute, the attribute value of alt+accesskey may be used, such that the set element may obtain the focus. The foregoing attribute may generally be used for the element, which has obtained the focus, such as link and form element. For instance, in the example, value of accesskey in the document outline list tag may be set as q, which denotes that a combination key of alt+q is the shortcut key of the tag. Thus, after disabled people know the shortcut key, at any time when browsing current webpage, as long as the shortcut key of alt+q has been pressed, the document outline list tag may be enabled to re-obtain the focus, such that the accessible auxiliary device may re-obtain and output each list item in the document outline list. Repeat operations of disabled people may be further facilitated.

Figure 3:
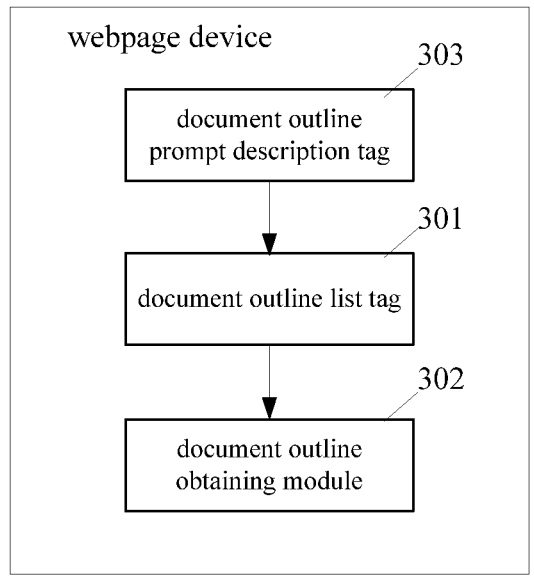
FIG. 3 is a schematic diagram illustrating another structure of an accessible webpage device, in accordance with an example of the present disclosure.

In a further example, the accessible webpage device may further include a document outline prompt description tag 303. As shown in FIG. 3, the document outline prompt description tag 303 is a first element of the accessible webpage device. The accessible semantic ID may be set in the document outline prompt description tag 303. Contents of the accessible semantic ID may include shortcut key information of the document outline list tag. Thus, after accessing current webpage, the document outline prompt description tag may firstly obtain the focus. Contents firstly outputted by the accessible auxiliary device are the contents of the accessible semantic ID in the document outline prompt description tag. That is, after accessing current webpage, the user may immediately learn the contents of the accessible semantic ID in the document outline prompt description tag, so as to timely learn that pressing which shortcut key may rapidly browse the document outline list.

In a further example, the document outline prompt description tag 303 may be a link tag. Destination contents pointed to by the link of the link tag may be detailed accessible descriptions. The contents of the accessible semantic ID in the document outline prompt description tag 303 may further include prompt information, which indicates to view the detailed accessible descriptions, and/or, other prompt description information, e.g., prompt information about executing a linear reading (such as "use arrow keys to execute the linear reading").

In a further example, the attribute value of shortcut key of the tag may be further set in the document outline prompt description tag 303. For example, value of accesskey in the document outline prompt description tag may be set as 0, which denotes that a combination key of alt+0 is the shortcut key of the tag. Thus, at any time when browsing current webpage, as long as the user presses the combination key of alt+0, the document outline prompt description tag may re-obtain the focus. Correspondingly, the accessible auxiliary device may re-output the contents of the accessible semantic ID in the document outline prompt description tag, such that repeat operations of disabled people may be further facilitated.

In addition, each example of the present disclosure may be implemented by a data processing device, such as a data processing program executed by a computer. Obviously, the data processing program may form the present disclosure. Besides, the data processing program, which is generally stored in one storage medium, may be executed, by directly reading the program from the storage medium, or installing or copying the program to a storage device (such as hardware, and/or, memory) of the data processing device. Thus, the foregoing storage medium may also form the present disclosure. The storage medium may use a recoding mode of any type, e.g., paper storage medium (such as paper tape), magnetic storage medium (such as floppy disk, hard disk, flash memory), optical storage medium (such as Compact Disc Read-only Memory (CD-ROM)), magneto-optical storage medium (such as Magneto-Optical Disk (MO)), and so on.

Thus, the present disclosure also provides a storage medium, which may store a data processing program. The data processing program is configured to execute any of foregoing method example in the present disclosure.

Figure 4:
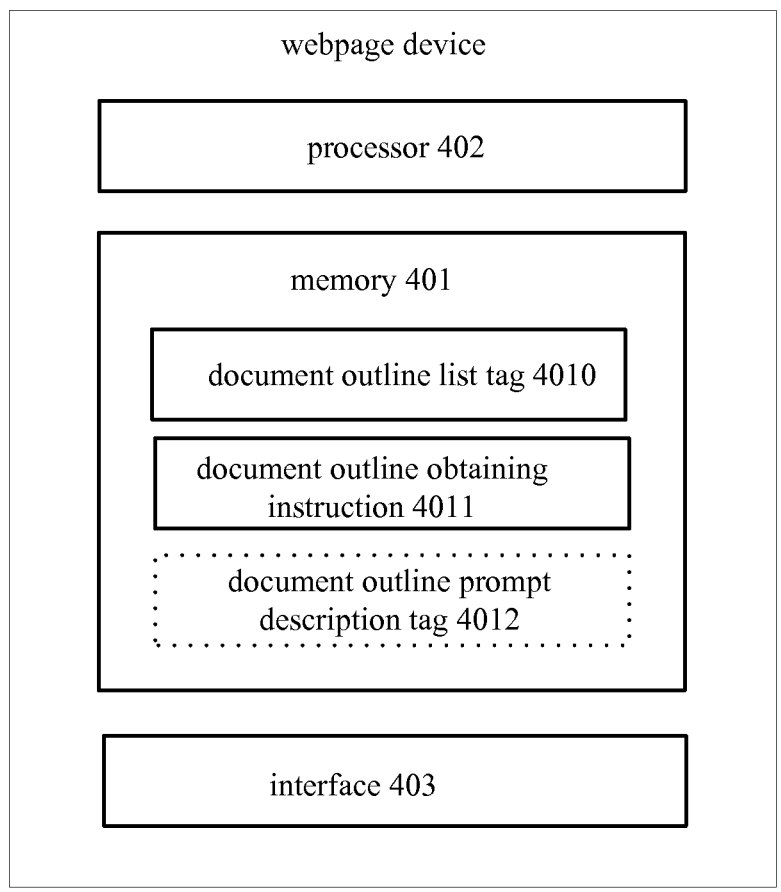
FIG. 4 is a schematic diagram illustrating still another structure of an accessible webpage device, in accordance with an example of the present disclosure.

For example, FIG. 4 is a schematic diagram illustrating still another structure of an accessible webpage device, in accordance with an example of the present disclosure. As shown in FIG. 4, the accessible webpage device may include a memory 401, a processor 402 in communication with the memory 401, and an interface 403. The memory 401 is configured to store a document outline list tag 4010 and a document outline obtaining instruction 4011. The document outline obtaining instruction 4011 is executable by the processor 402.

After the document outline list tag 4010 obtains a focus, when being executed by the processor 402, the document outline obtaining instruction 4011 indicates to execute the following operations. Traverse all title tags of a specified level in current webpage, after current webpage loads. Add an anchor point to each title tag of the specified level via the interface 403. Respectively copy text information of each title tag of the specified level to a corresponding link newly established. Enable the link newly established to point to the anchor point of corresponding title tag. Take each link newly established as a list item. Add the list item to the document outline list tag.

Thus, after the document outline list tag 4010 obtains the focus, that is, after the user browses the document outline list tag 4010 by utilizing the accessible webpage device, by enabling the foregoing document outline obtaining instruction 4011 to be executed by the processor 402, the document outline list of current webpage may be obtained and added to the document outline list tag 4010. Thus, the accessible webpage device may be enabled to obtain and output each list item of the document outline list, that is, each title of the specified level, so as to improve information amount learned by disabled people from a webpage with a large amount of information, and improve convenient degree for the disabled people to learn information. Meanwhile, portability for users to switch among each document content area of specified level in the webpage may be enhanced.

In a specific example, an accessible semantic ID is set in the document outline list tag 4010. The contents of the accessible semantic ID may include operation instructions of the document outline. Thus, after the document outline list tag 4010 obtains the focus, the accessible webpage device may be enabled to directly output the contents of the accessible semantic ID, that is, the operation instructions of the document outline. Thus, disabled people may be further instructed to execute subsequent document outline operations, and convenient degree for disabled people to learn information may also be improved.

In a specific example, the document outline list tag 4010 is located after the navigation position of the webpage. Thus, when disabled people browse webpage information in sequence by using the accessible webpage device, after browsing the navigation information, the document outline list tag 4010 may be enabled to timely obtain the focus. Thus, the disabled people may be further facilitated to timely obtain the document outline contents of the webpage, and timeliness may also be improved.

In a specific example, an attribute value about the shortcut key of the tag may also be set in the document outline list tag 4010. For example, in the HTML, attribute of the shortcut key is generally accesskey. After using the accesskey attribute, the attribute value of alt+accesskey may be used, such that the set element may obtain the focus. The foregoing attribute may generally be used for the element, which has obtained the focus, such as link and form element. For instance, in the example, value of accesskey in the document outline list tag 4010 may be set as q, which denotes that a combination key of alt+q is the shortcut key of the tag. Thus, after disabled people know the shortcut key, at any time when browsing current webpage, as long as the shortcut key of alt+q has been pressed, the document outline list tag 4010 may be enabled to re-obtain the focus, such that the accessible webpage device may re-obtain and output each list item in the document outline list. Repeat operations of disabled people may be further facilitated.

In a further example, the memory 401 may further store a document outline prompt description tag 4012, functions of which are similar to the document outline prompt description tag 303 in the foregoing example, which will not be repeated here.

The invention claimed is:

1. An accessibility processing method of webpage contents, which is performed by a processor by executing instructions stored in a memory, wherein the processor and memory are comprised by a webpage-access device, comprising:
adding a document outline list tag to a webpage;
after the document outline list tag is parsed by a web browser:
traversing all title tags of a specified level in the webpage;
adding an anchor point to each title tag of the specified level;
respectively copying text information of the each title tag of the specified level to a corresponding link newly established;
enabling the link newly established to point to an anchor point of a corresponding title tag;
taking each link newly established as a list item;
adding the list item to the document outline list tag; and
adding a document outline prompt description tag as a first-priority element to the webpage so that the document outline prompt description tag firstly obtains focus when the webpage is accessed, the document outline prompt description tag including style codes of Cascading Style Sheet (CSS) configured not to be displayed visually, the document outline prompt description tag configured to be read out loud to be listened to by a user; and
setting an accessible semantic identity (ID) in the document outline prompt description tag, wherein:
contents of the accessible semantic ID comprise shortcut key information of the document outline list tag, and
the contents of the accessible semantic ID in the document outline prompt description tag further comprise prompt information for viewing detailed accessible descriptions.

2. The method according to claim 1, further comprising:
setting a second accessible semantic identity (ID) in the document outline list tag, wherein contents of the second accessible semantic ID comprise operation instructions of a document outline.

3. The method according to claim 1, wherein adding the document outline list tag to the webpage comprises:
adding the document outline list tag to a navigation position of the webpage.

4. The method according to claim 1, further comprising:
setting an attribute value of a shortcut key of a tag in the document outline list tag.

5. The method according to claim 4, wherein:
the document outline prompt description tag is a link tag; and
destination contents pointed to by a link of the link tag comprise the detailed accessible descriptions.

6. The method according to claim 4, further comprising:
setting the attribute value of the shortcut key of the tag in the document outline prompt description tag.

7. The method according to claim 1, wherein the title tag of the specified level is an h2 tag.

8. A webpage-access device, comprising:
a memory storing instructions;
a processor in communication with the memory, wherein, when the processor executes the instructions, the processor is configured to cause the webpage-access device to:
add a document outline list tag to a webpage;
wherein after the document outline list tag is parsed by a web browser:
after the webpage loads, traverse all title tags of a specified level in the webpage;
add an anchor point to each title tag of the specified level via an interface;
respectively copy text information of the each title tag of the specified level to a corresponding link newly established;
enable the link newly established to point to an anchor point of a corresponding title tag;
take each link newly established as a list item;
add the list item to the document outline list tag; and
add a document outline prompt description tag as a first-priority element to the webpage so that the document outline prompt description tag firstly obtains focus when the webpage is accessed, the document outline prompt description tag including style codes of Cascading Style Sheet (CSS) configured not to be displayed visually, the document outline prompt description tag configured to be read out loud to be listened to by a user; and
set an accessible semantic ID in the document outline prompt description tag, wherein:
contents of the accessible semantic ID comprise shortcut key information of the document outline list tag, and
the contents of the accessible semantic ID in the document outline prompt description tag further comprise prompt information for viewing detailed accessible descriptions.

9. The device according to claim 8, wherein, when the processor executes the instructions, the processor is further configured to cause the webpage-access device to:
set a second accessible semantic identity (ID) in the document outline list tag, wherein contents of the second accessible semantic ID comprise operation instructions of a document outline.

10. The device according to claim 8, wherein, when the processor is configured to cause the webpage-access device to add the document outline list tag to the webpage, the processor is configured to cause the webpage-access device to:
add the document outline list tag to a navigation position of the webpage.

11. The device according to claim 8, wherein when the processor executes the instructions, the processor is further configured to cause the webpage-access device to:
set an attribute value of a shortcut key of a tag is the document outline list tag.

12. The device according to claim 11, wherein:
the document outline prompt description tag is a link tag; and
destination contents pointed to by a link of the link tag comprise the detailed accessible descriptions.

13. The device according to claim 11, wherein when the processor executes the instructions, the processor is further configured to cause the webpage-access device to:
set the attribute value of the shortcut key of the tag in the document outline prompt description tag.

14. The device according to claim 8, wherein the title tag of the specified level is an h2 tag.

* * * * *